United States Patent
Stommen et al.

(10) Patent No.: US 7,551,970 B2
(45) Date of Patent: Jun. 23, 2009

(54) POSITIONING APPARATUS GRAVITY COMPENSATION DEVICE AND METHOD FOR COMPENSATING GRAVITATIONAL FORCES

(75) Inventors: Bernard Jacob Andries Stommen, Eindhoven (NL); Robertus Leonardus Tousain, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 269 days.

(21) Appl. No.: 10/567,220

(22) PCT Filed: Jul. 29, 2004

(86) PCT No.: PCT/IB2004/051325

§ 371 (c)(1),
(2), (4) Date: Feb. 3, 2006

(87) PCT Pub. No.: WO2005/015334

PCT Pub. Date: Feb. 17, 2005

(65) Prior Publication Data

US 2006/0259165 A1    Nov. 16, 2006

(30) Foreign Application Priority Data

Aug. 7, 2003    (EP) .................... 03102466

(51) Int. Cl.
*G05B 19/18* (2006.01)
*G05D 23/275* (2006.01)
(52) U.S. Cl. .................... 700/61; 318/632
(58) Field of Classification Search .......... 33/283, 33/398, 503; 700/56, 61–63, 279, 280; 318/632, 318/568.1, 649
See application file for complete search history.

(56) References Cited

U.S. PATENT DOCUMENTS

| | | | | | |
|---|---|---|---|---|---|
| 3,827,333 | A | * | 8/1974 | Hurd | 409/187 |
| 4,591,772 | A | * | 5/1986 | Hollow | 318/632 |
| 4,733,150 | A | * | 3/1988 | Papiernik et al. | 318/632 |
| 4,964,221 | A | * | 10/1990 | Breyer et al. | 33/503 |
| 5,040,613 | A | * | 8/1991 | Dodd et al. | 172/5 |
| 5,138,800 | A | * | 8/1992 | Janusz | 451/5 |
| 5,425,237 | A | * | 6/1995 | Suer | 60/414 |
| 5,671,058 | A | * | 9/1997 | Kawaguchi | 356/401 |

(Continued)

FOREIGN PATENT DOCUMENTS

JP     63168709 A  *  7/1988

(Continued)

*Primary Examiner*—Crystal J Barnes Bullock

(57) ABSTRACT

The present invention relates to a positioning apparatus. The positioning apparatus comprises at least one position sensor, at least one position controller and at least one position actuator, wherein the or each position sensor measures the position of a position-controlled device, wherein the or each position controller uses measurement signals provided by the or each position sensor as input signals, and wherein output signals generated by the or each position controller are used by the or each position actuator to control the position of said position-controlled device. The positioning apparatus further comprising a gravity compensation device compensating gravitational forces acting on said position-controlled device, wherein the gravity compensation device includes at least one gravity compensation controller and at least one gravity compensation actuator, wherein the or each gravity compensation controller uses the output signals generated by the or each position controller as input signals, thereby generating output signals used by the or each gravity compensation actuator to compensate gravitational forces acting on said position-controlled device.

21 Claims, 4 Drawing Sheets

U.S. PATENT DOCUMENTS

| | | | |
|---|---|---|---|
| 5,767,648 A * | 6/1998 | Morel et al. | 318/568.1 |
| 5,812,420 A * | 9/1998 | Takahashi | 700/280 |
| 5,844,664 A * | 12/1998 | Van Kimmenade et al. | 355/53 |
| 5,844,666 A * | 12/1998 | Van Engelen et al. | 355/72 |
| 5,847,874 A * | 12/1998 | Sasao et al. | 359/554 |
| 6,008,882 A * | 12/1999 | Ito et al. | 355/53 |
| 6,012,216 A * | 1/2000 | Esteves et al. | 29/564.7 |
| 6,788,386 B2 * | 9/2004 | Cox et al. | 355/53 |
| 6,872,958 B2 * | 3/2005 | Andeen et al. | 250/492.2 |
| 6,982,681 B2 * | 1/2006 | Orfei et al. | 343/915 |
| 2008/0180053 A1 * | 7/2008 | Lee | 318/649 |

FOREIGN PATENT DOCUMENTS

| | | | |
|---|---|---|---|
| JP | 63243544 A | * | 10/1988 |
| JP | 07295649 A | * | 11/1995 |
| JP | 2001322045 A | * | 11/2001 |

* cited by examiner

POSITIONING APPARATUS GRAVITY COMPENSATION DEVICE AND METHOD FOR COMPENSATING GRAVITATIONAL FORCES

The present invention relates to a positioning apparatus for a position-controlled device comprising a gravity compensation device compensating gravitational forces acting on said position-controlled device. Further, the present invention relates to a method for compensating gravitational forces.

The compensation of gravitational forces acting on a position-controlled device is essential for positioning apparatuses, especially for high-precision motion systems used in e.g. measuring machines, manufacturing machines, pick-and-place machines or robots. The compensation of gravitational forces by using a gravity compensation device guarantees that the required force and the heat dissipation of a position actuator can be kept at lower levels.

In most applications a position actuator is used. As mentioned above, the use of a gravity compensation device keeps the forces to be generated by the position actuator smallest possible. The size of the position actuator depends on the maximum and average required forces. If the required forces can be reduced, the size and weight of the position actuator can be reduced. In addition, the heat dissipation of the position actuator can be minimized, because heat dissipation is directly related to the generated forces.

Gravity compensation devices known from the prior art make use of air cylinders or permanent magnets or mechanical springs to compensate gravitational forces. The use of air cylinders is associated with the disadvantage that an air supply is needed which results in a complex and expensive solution. Mechanical springs are sensitive to load variations. The use of permanent magnets is associated with the disadvantage of high weight and with the disadvantage of being sensitive to load variations and long-stroke motion.

The present invention provides a positioning apparatus, especially for measuring machines, manufacturing machines or the like, comprising at least one position sensor, at least one position controller and at least one position actuator, wherein the or each position sensor measures the position of a position controlled device, wherein the or each position controller uses measurement signals provided by the or each position sensor as input signals, and wherein output signals generated by the or each position controller are used by the or each position actuator to control the position of said position-controlled device, the positioning apparatus further comprising a gravity compensation device compensating gravitational forces acting on said position-controlled device, wherein the gravity compensation device includes at least one gravity compensation controller and at least one gravity compensation actuator, wherein the or each gravity compensation controller uses the output signals generated by the or each position controller as input signals, thereby generating output signals used by the or each gravity compensation actuator to compensate gravitational forces acting on said position-controlled device. The present invention has several advantages compared with the prior art. Unlike air cylinders, the present invention does not require any air supply. The present invention provides a cheaper and more compact solution. Compared to the prior art using mechanical springs, the present invention is less sensitive to load variations and introduces less disturbance force in case of relative motion between the position-controlled device and its environment. Compared to the prior art using permanent magnets, the present invention is lighter and less expensive, and less sensitive to load variations. The solution of the present invention is suited to long strokes and variable load situations.

In accordance with a preferred embodiment of the invention the gravity compensation actuator comprises a spring, a string, a pulley and a motor. The spring is attached with a first end to the position-controlled device and with a second end to the string. The string is wound around the pulley, whereby the pulley is driven by the motor, and whereby the motor is controlled by the output signals generated by the gravity compensation controller. The pulley is driven by the motor in a way that the tension in the spring is kept constant and equal to the gravitational forces acting on said position-controlled device.

In accordance with a further improved, preferred embodiment of the invention the gravity compensation device includes two gravity compensation controllers, wherein a first gravity compensation controller uses the output signals generated by the position controller as input signals, wherein a second gravity compensation controller uses the output signals generated by the first gravity compensation controller as input signals, and wherein output signals of said second gravity compensation controller are used to control the gravity compensation actuator. The output signals generated by the first gravity compensation controller are summed with a position setpoint signal of said position controller, whereby the resulting signal is used as setpoint for said second compensation gravity controller. The second gravity compensation controller uses the measurement signal of a motor position sensor as input signal, whereby said motor position sensor measures the position of the motor of said gravity compensation actuator.

The present invention further provides a gravity compensation device for compensating gravitational forces acting on a position-controlled device, wherein the position of said position-controlled device is measured by at least one position sensor and controlled by at least one position controller, the gravity compensation device comprises at least one gravity compensation controller and at least one gravity compensation actuator, whereby the or each gravity compensation controller uses the output signals generated by the or each position controller as input signals, thereby generating output signals used by the or each gravity compensation actuator to compensate gravitational forces acting on said position-controlled device.

In addition, the present invention provides a method for compensating gravitational forces.

Figure 1:
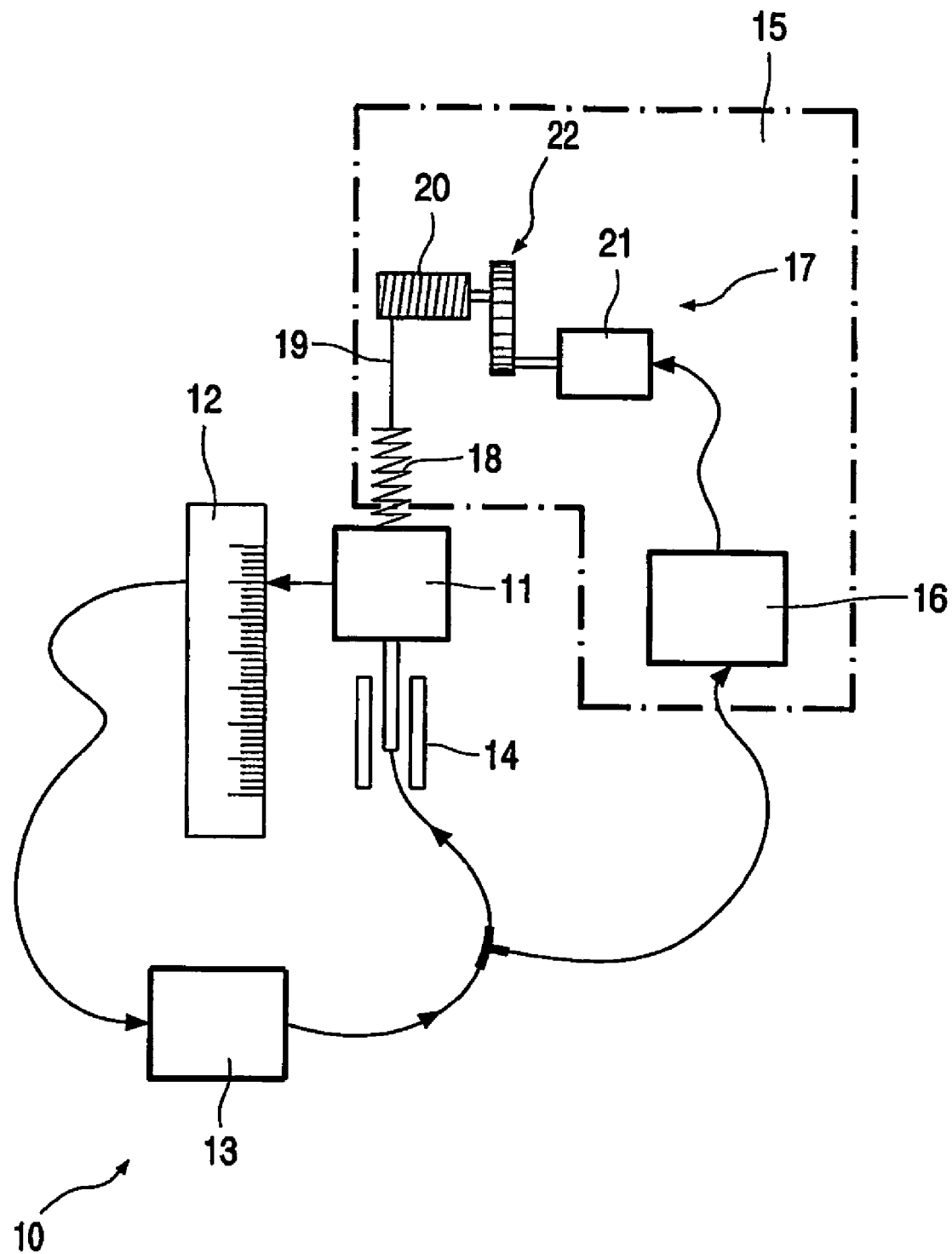
FIG. 1 shows a block diagram of a positioning apparatus according to a first preferred embodiment of the present invention.

FIG. 1 shows a positioning apparatus 10 according to a first preferred embodiment of the present invention. The positioning apparatus 10 controls the position of a position-controlled device 11. The position of the position-controlled device 11 is measured by the position sensor 12 whereby the measurement signal provided by the position sensor 12 is transmitted to a position controller 13 as input signal or so-called controlled variable. As a function of the measurement signal provided by the position sensor 12 and a set-point for the position of the position-controlled device 11, the position controller 13 generates an output signal or a so-called manipulated variable which is used as input signal for a position actuator 14. The position actuator 14 is designed as a direct-drive motor.

The positioning apparatus 10 further comprises a gravity compensation device 15 for compensating gravitational forces acting on the position-controlled device 11. According to the present invention, the gravity compensation device 15 of the position apparatus 10 shown in FIG. 1 comprises a gravity compensation controller 16 and a gravity compensation actuator 17. The gravity compensation controller 16 uses the output signals generated by the position controller 13 as input signal or so-called controlled variable. The gravity compensation controller 16 generates an output signal as a function of the output signal of the position controller 13. The output signal of the gravity compensation controller 16 is used by the gravity compensation actuator 17 to compensate gravitational forces acting on the position-controlled device 11.

The gravity compensation actuator 17 comprises a spring 18, a string 19, a pulley 20 and a motor 21. The spring 18 is with a first end attached to the position-controlled device 11 and with a second, opposite end attached to the string 19. The string 19 is wound around the pulley 20. The pulley 20 is driven by the motor 21, whereby a gearhead 22 is located between the pulley 20 and motor 21. In the embodiment shown in FIG. 1 the output signal generated by the gravity compensation controller 16 is directly used as input signal for the motor 21 which is designed as a voltage-driven direct current motor. Said voltage-driven direct current motor is controlled on the basis of the output signal of the position controller 13 only. The embodiment shown in FIG. 1 has a very simple design which can even be realized using analogue electronics.

Figure 2:
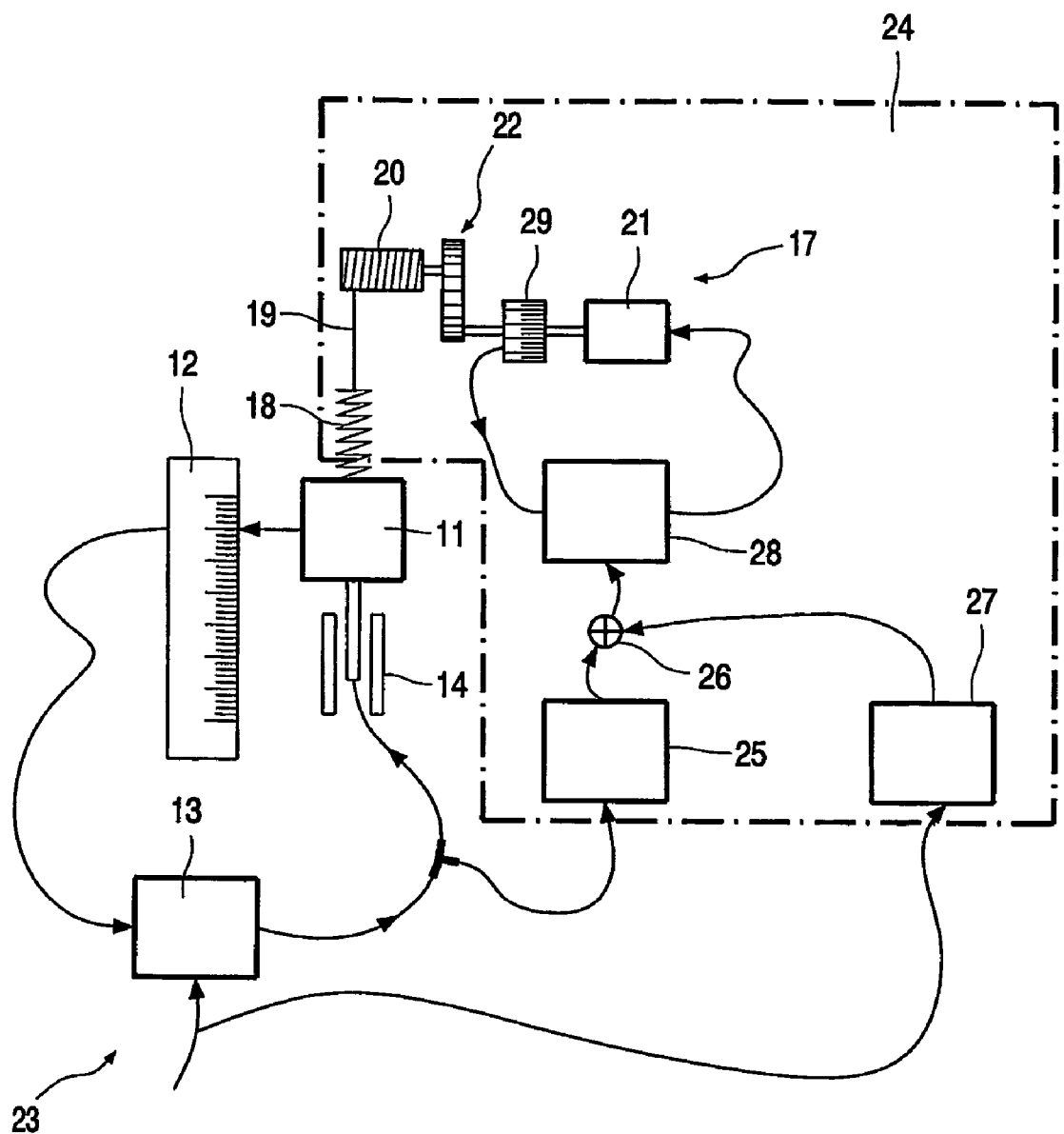
FIG. 2 shows a block diagram of a positioning apparatus according to a second preferred embodiment of the present invention.

FIG. 2 shows a second embodiment of the present invention. FIG. 2 shows a positioning apparatus 23 which controls the position of the position-controlled device. The positioning apparatus 23 shown in FIG. 2 comprises like the positioning apparatus 10 in FIG. 1 a position sensor, a position controller and a position actuator. In order to avoid duplications, the same reference numerals are used for similar components.

In comparison with the embodiment of FIG. 1 the positioning apparatus 23 of FIG. 2 comprises a gravity compensation device 24 including two gravity compensation controllers. A first gravity compensation controller 25 uses the output signal from the position controller 13 as input signal or so-called controlled variable. The output signal from said first gravity compensation controller 25 is transmitted to a summing device 26. In the summing device 26, the output signal from the first gravity compensation controller 25 is summed with the set point signal of the position controller 13, whereby the set point signal of the position controller 13 is multiplied by a transmission factor as indicated by box 27 in FIG. 2. The signal resulting from the summation of the output signal from the first gravity compensation controller 25 and the set point signal of the position controller 13 multiplied by the transmission factor is transmitted to a second gravity compensation controller 28 and used as set point for the second gravity compensation controller 28. The output signal generated by the second gravity compensation controller 28 is used to control the gravity compensation actuator 17. The gravity compensation actuator 17 of the embodiment shown in FIG. 2 comprises like the gravity compensation actuator of the embodiment in FIG. 1 spring 18, string 19, pulley 20, motor 21 and a gearhead 22. In order to avoid duplications, the same reference signs are used for similar components.

The second gravity compensation controller 28 of the embodiment according to FIG. 2 uses a measurement signal of a motor position sensor 29 as input signal or so-called controlled variable. As a function of the measurement signal provided by the motor position sensor 29 and as a function of the set point signal the second gravity compensation controller 28 generates an output signal used to control the motor 21 of the gravity compensation actuator 17. In the embodiment according to FIG. 2, the knowledge on the motion of the position-controlled device 11 is used in the controls of the motor 21. This is realized by using the motor position sensor 29 and a separate control loop provided by the second gravity compensation controller 28. The set point for said second gravity compensation controller 28 is directly related to the set point of the position controller 13. The gravity compensation device 24 of FIG. 2 stills tries to control the output of the position control loop provided by the position controller 13 to zero, however, it now acts on the set point of the control loop for the motor 21 provided by the second gravity compensation controller 28.

Both embodiments according to FIG. 1 and 2 make use of a gravity compensation device, whereby the gravity compensation device includes a gravity compensation actuator comprising a string which is attached to the position-controlled device by a spring and wound around a pulley which is driven by a motor gearhead combination in such a way that the tension in the spring is kept constant and equal to gravitational forces acting on the position-controlled device. This is ensured by at least one gravity compensation controller which uses the output of the position controller as controlled variable and which generates an output signal as a so-called manipulated variable for the gravity compensation actuator.

Figure 3:
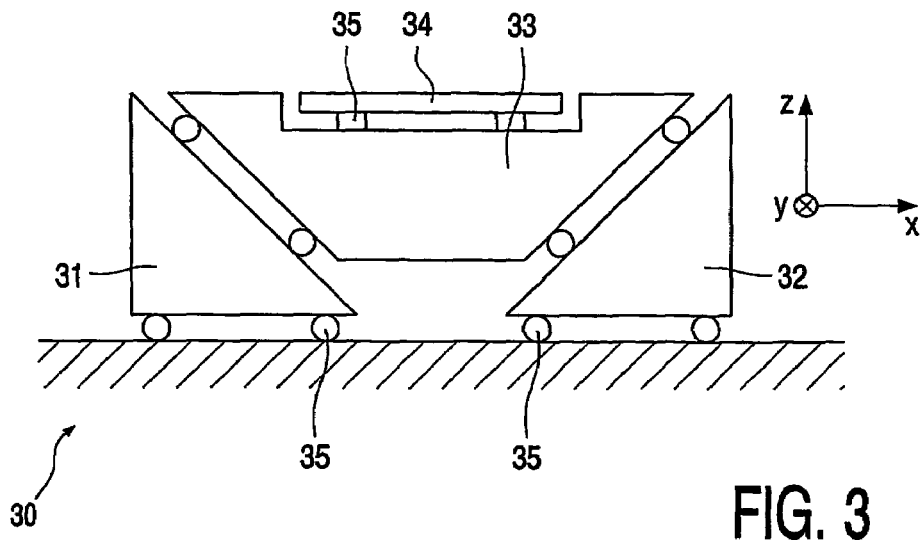
FIG. 3 shows a cross-sectional side-view of a 3-axis positioning stage.

The present invention can be applied in all kinds of positioning apparatuses, for example in measuring machines, pick and place machines, manufacturing machines or robots. With reference to FIGS. 3 to 7, an application of the invention in a low-cost 3-axis positioning stage will be described. FIG. 3 shows a positioning stage 30 which includes four slides, namely a first slide 31, a second slide 32, a third slide 33 and a fourth slide 34. The positioning in the x-axis and z-axis is realized by moving the first slide 31 and the second slide 32 simultaneously. The positioning in the y-axis is realized by moving the fourth slide 34. The slides 31, 32 and 34 are driven by direct drive position actuators 35. A gravity compensation device will be used in connection with the positioning stage according to FIG. 3 to prevent the positioning actuators 35 of the slides 31 and 32 having to lift the weight of the center slide 33 and the fourth slide 34.

Figure 4:
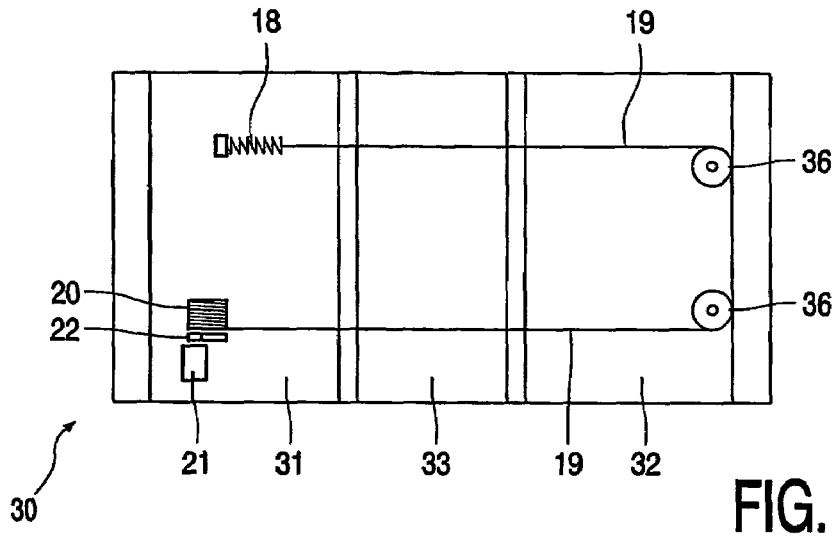
FIG. 4 shows a cross-sectional bottom-view of a 3-axis positioning stage making use of the gravity compensation device according to the present invention.
Figure 5:
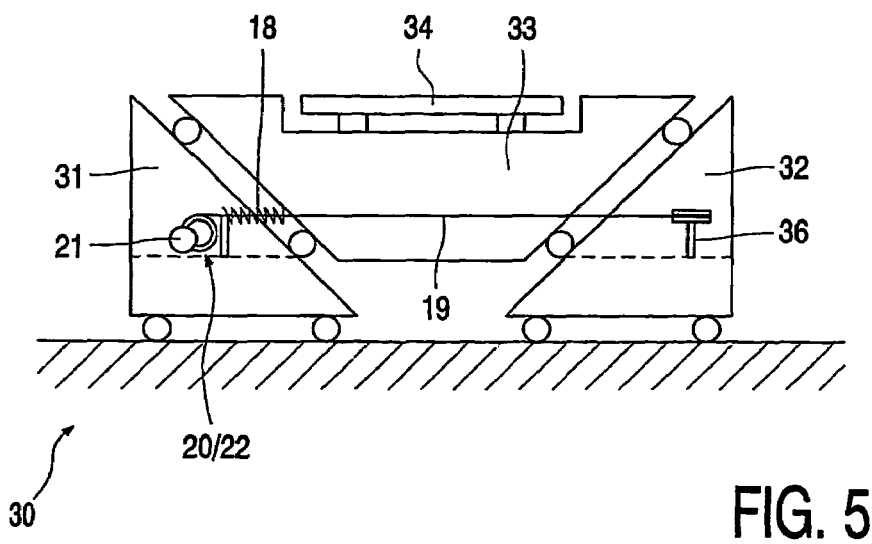
FIG. 5 shows a cross-sectional side-view of the 3-axis positioning stage according to FIG. 4.

FIGS. 4 and 5 show a first use of a gravity compensation device in the particular application of a positioning stage 30. FIGS. 4 and 5 show the gravity compensation actuator 17 of the gravity compensation device including the spring 18, the string 19 wound around the pulley 20, whereby the pulley 20 is driven by the motor 21 and gearhead 22. In the use shown in FIGS. 4 and 5 the motor 21, the gearhead 22, the pulley 20 and the spring 18 are attached to the first slide 31. Guide rollers 36 are attached to the second slide 32 to guide the string 19 from the spring 18 to the pulley 20. In the particular application shown in FIGS. 3 to 5 the entire gravity compensation device is applied horizontally and integrated into the positioning stage 30.

Figure 6:
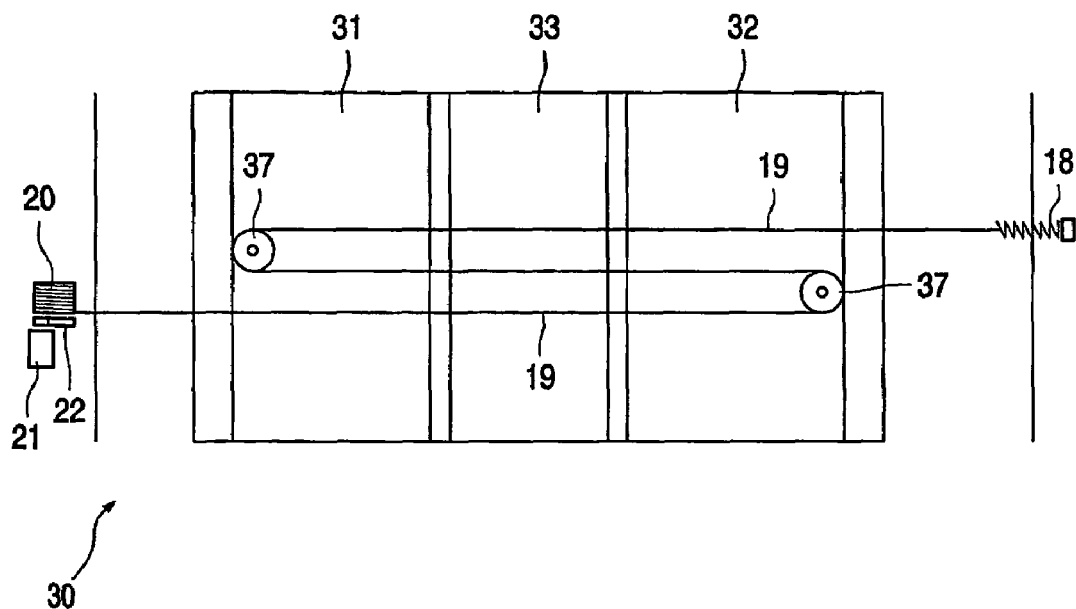
FIG. 6 shows a cross-sectional bottom-view of another 3-axis positioning stage making use of the gravity compensation device according to the present invention.
Figure 7:
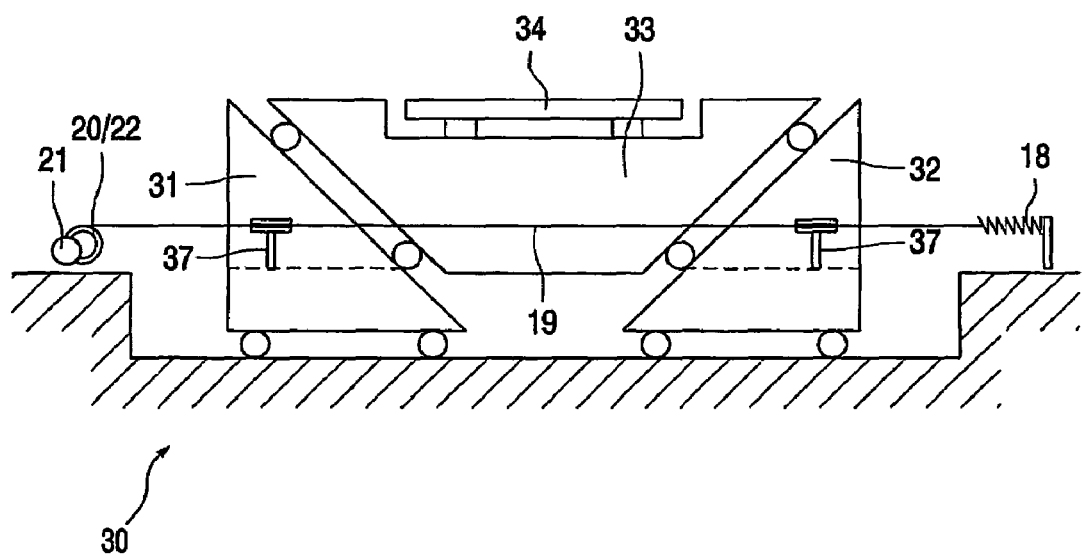
FIG. 7 shows a cross-sectional side-view of the 3-axis positioning stage according to FIG. 6.

FIGS. 6 and 7 show an alternative use of the gravity compensation device, especially of the gravity compensation actuator 17 in connection with the positioning stage 30. In the use according to FIGS. 6 and 7, the concept is also applied horizontally, however, the components of the gravity compensation actuator are not attached to the slides but mounted on the surroundings or the outside wall.

According to FIGS. 6 and 7, the pulley 20, motor 21 and gearhead 22 are mounted on a first wall and the spring 18 is mounted on an adjacent, second wall of the surroundings of the positioning stage 30. On the first slide 31 and the second slide 32 there are attached guide rollers 37. A first guide roller 37 is attached to the first slide 31 and a second guide roller 37 is attached to the second slide 32. The guide rollers 37 are used to guide the string 19 from the pulley 20 to the spring 18 while bringing the string 19 into engagement with the slides 31 and 32. In the use shown in FIGS. 6 and 7, disturbance forces generated by the motor 21 of the gravity actuator will not directly act on the slides 31, 32, 33, and 34, which is of advantage in high-precision motion systems.

The invention claimed is:

1. Positioning apparatus comprising:
at least one position sensor,
at least one position controller and
at least one position actuator,
wherein the or each position sensor measures the position of a position-controlled device,
wherein the or each position controller uses measurement signals provided by the or each position sensor as input signals,
wherein output signals generated by the or each position controller are used by the or each position actuator to control the position of said position-controlled device,
the positioning apparatus further comprising a gravity compensation device compensating gravitational forces acting on said position-controlled device, wherein the gravity compensation device includes at least one gravity compensation controller and at least one gravity compensation actuator, wherein the or each gravity compensation controller uses the output signals generated by the or each position controller as input signals, thereby generating output signals used by the or each gravity compensation actuator to compensate gravitational forces acting on said position-controlled device,
wherein the gravity compensation actuator comprises a spring, a string, a pulley and a motor.

2. Positioning apparatus according to claim 1, wherein the spring is attached with a first end preferably to the position-controlled device and with a second end to the string.

3. Positioning apparatus according to claim 1, wherein the string is wound around the pulley, wherein the pulley is driven by the motor, and wherein the motor is controlled by the output signals generated by the gravity compensation controller.

4. Positioning apparatus according to claim 1, wherein the pulley is driven by the motor in a way that the tension in the spring is kept constant and equal to the gravitational forces acting on said position-controlled device.

5. Positioning apparatus comprising:
at least one position sensor,
at least one position controller and
at least one position actuator,
wherein the or each position sensor measures the position of a position-controlled device,
wherein the or each position controller uses measurement signals provided by the or each position sensor as input signals,
wherein output signals generated by the or each position controller are used by the or each position actuator to control the position of said position-controlled device,
the positioning apparatus further comprising a gravity compensation device compensating gravitational forces acting on said position-controlled device, wherein the gravity compensation device includes at least one gravity compensation controller and at least one gravity compensation actuator, wherein the or each gravity compensation controller uses the output signals generated by the or each position controller as input signals, thereby generating output signals used by the or each gravity compensation actuator to compensate gravitational forces acting on said position-controlled device,
the gravity compensation device further including two gravity compensation controllers, wherein a first gravity compensation controller of the two gravity compensation controllers uses the output signals generated by the position controller as input signals, wherein a second gravity compensation controller of the two gravity compensation controllers uses the output signals generated by the first gravity compensation controller as input signals, and wherein output signals from said second gravity compensation controller are used to control the gravity compensation actuator,
wherein the output signals generated by the first gravity compensation controller are summed with a position setpoint signal of said position controller, wherein the resulting signal is used as setpoint for said second gravity compensation controller.

6. Positioning apparatus comprising:
at least one position sensor,
at least one position controller and
at least one position actuator,
wherein the or each position sensor measures the position of a position-controlled device,
wherein the or each position controller uses measurement signals provided by the or each position sensor as input signals,
wherein output signals generated by the or each position controller are used by the or each position actuator to control the position of said position-controlled device,
the positioning apparatus further comprising a gravity compensation device compensating gravitational forces acting on said position-controlled device, wherein the gravity compensation device includes at least one gravity compensation controller and at least one gravity compensation actuator, wherein the or each gravity compensation controller uses the output signals generated by the or each position controller as input signals, thereby generating output signals used by the or each gravity compensation actuator to compensate gravitational forces acting on said position-controlled device,
the gravity compensation device further including two gravity compensation controllers, wherein a first gravity compensation controller of the two gravity compensation controllers uses the output signals generated by the position controller as input signals, wherein a second gravity compensation controller of the two gravity compensation controllers uses the output signals generated by the first gravity compensation controller as input signals, and wherein output signals from said second gravity compensation controller are used to control the gravity compensation actuator,
wherein the second gravity compensation controller uses the measurement signal of a motor position sensor as input signal, wherein said motor position sensor measures the position of the motor of said gravity compensation actuator.

7. Gravity compensation device for compensating gravitational forces acting on a position-controlled device, wherein the position of said position-controlled device is measured by at least one position sensor and controlled by at least one position controller, the device having at least one gravity compensation controller and at least one gravity compensation actuator, wherein the or each gravity compensation controller uses the output signals generated by the or each position controller as input signals, thereby generating output signals used by the or each gravity compensation actuator to compensate gravitational forces acting on said position-controlled device, wherein the gravity compensation actuator comprises a spring, a string, a pulley and a motor.

8. Gravity compensation device according to claim 7, wherein the spring is attached with a first end preferably to the position-controlled device and with a second end to the string.

9. Gravity compensation device according to claim 7, wherein the string is wound around the pulley, whereby the pulley is driven by the motor, and whereby the motor is controlled by the output signals generated by the gravity compensation controller.

10. Gravity compensation device according to claim 7, wherein the pulley is driven by the motor in a way that the tension in the spring is kept constant and equal to the gravitational forces acting on said position-controlled device.

11. Gravity compensation device for compensating gravitational forces acting on a position-controlled device, wherein the position of said position-controlled device is measured by at least one position sensor and controlled by at least one position controller, the gravity compensation device comprising at least one first gravity compensation controller and at least one gravity compensation actuator, wherein the at least one first gravity compensation controller uses the output signals generated by the at least one position controller as input signals, thereby generating output signals used by the at least one gravity compensation actuator to compensate gravitational forces acting on said position-controlled device, the device further comprising a second gravity compensation controller, wherein the at least one first gravity compensation controller uses the output signals generated by the position controller as input signals, wherein the second gravity compensation controller uses the output signals generated by the at least one first gravity compensation controller as input signals, and wherein output signals from said second gravity compensation controller are used to control the gravity compensation actuator, wherein the output signals generated by the first gravity compensation controller are summed with a position setpoint signal of said position controller, whereby the resulting signal is used as setpoint for said second gravity compensation controller.

12. Gravity compensation device for compensating gravitational forces acting on a position-controlled device, wherein the position of said position-controlled device is measured by at least one position sensor and controlled by at least one position controller, the gravity compensation device comprising at least one first gravity compensation controller and at least one gravity compensation actuator, wherein the at least one first gravity compensation controller uses the output signals generated by the at least one position controller as input signals, thereby generating output signals used by the at least one gravity compensation actuator to compensate gravitational forces acting on said position-controlled device, the gravity compensation device further comprising a second gravity compensation controller, wherein the at least one first gravity compensation controller uses the output signals generated by the position controller as input signals, wherein the second gravity compensation controller uses the output signals generated by the at least one first gravity compensation controller as input signals, and wherein output signals from said second gravity compensation controller are used to control the gravity compensation actuator, wherein the second gravity compensation controller uses the measurement signal of a motor position sensor as input signal, whereby said motor position sensor measures the position of the motor of said gravity compensation actuator.

13. Method for compensating gravitational forces acting on a position-controlled device, whereby the position of said position-controlled device is measured by at least one position sensor and controlled by at least one position controller, wherein at least one gravity compensation controller uses output signals generated by the or each position controller as input signals thereby generating output signals used by at least one gravity compensation actuator to compensate gravitational forces acting on said position-controlled device, wherein the gravity compensation actuator comprises a spring, a string, a pulley and a motor, whereby the spring is attached with a first end to the position-controlled device and with a second end to the string, wherein the string is wound around the pulley, and wherein the pulley is driven by the motor using the output signals generated by the gravity compensation controller in a way that the tension in the spring is kept constant and equal to the gravitational forces acting on said position-controlled device.

14. Method for compensating gravitational forces acting on a position-controlled device, whereby the position of said position-controlled device is measured by at least one position sensor and controlled by at least one position controller, whereby at least one gravity compensation controller uses output signals generated by the or each position controller as input signals thereby generating output signals used by at least one gravity compensation actuator to compensate gravitational forces acting on said position-controlled device, wherein two gravity compensation controllers are used, a first gravity compensation controller using the output signals generated by the position controller as input signals and a second gravity compensation controller using the output signals generated by the first gravity compensation controller as input signals, output signals of said second gravity compensation controller being used to control the gravity compensation actuator, output signals generated by the first gravity compensation controller being summed with a position setpoint signal of said position controller, whereby the resulting signal is used as setpoint for said second gravity compensation controller, and the second gravity compensation controller uses the measurement signal of a motor position sensor as input signal, whereby said motor position sensor measures the position of the motor of said gravity compensation actuator.

15. A positioning apparatus comprising:
at least one position sensor, at least one position controller, at least one position actuator and at least one gravity compensation device,
the gravity compensation device comprising at least one gravity compensation controller and at least one gravity compensation actuator and being capable of compensating gravitational forces acting on a position-controlled device,
wherein the position sensor is configured to measure a position of the position-controlled device, the position controller is capable of using measurement signals provided by the position sensor as input signals to generate output signals, and the output signals generated by the position controller are manipulated variable output signals used by the position actuator to control the position of the position-controlled device and further serve as signals inputting a controlled variable to the at least one gravity compensation controller, thereby generating output signals used by the gravity compensation actuator to compensate gravitational forces acting on the position-controlled device.

16. The positioning apparatus of claim 15, wherein the gravity compensation device further includes a second gravity compensation controller, wherein the gravity compensation controller uses the output signals generated by the position controller as input signals of a controlled variable, and wherein the second gravity compensation controller uses the output signals generated by the first gravity compensation controller as input signals, and wherein output signals from said second gravity compensation controller are used to control the gravity compensation actuator.

17. A gravity compensation device for compensating gravitational forces acting on a position-controlled device, wherein the position of the position-controlled device is measured by at least one position sensor and controlled by at least one position controller, the gravity compensation device comprising at least one gravity compensation controller and at least one gravity compensation actuator, wherein the gravity compensation controller uses output signals of a manipulated variable generated by the position controller as input signals of a controlled variable, thereby generating output signals used by the or each gravity compensation actuator to compensate gravitational forces acting on the position-controlled device.

18. The gravity compensation device of claim 17, comprising a second gravity compensation controller, wherein the gravity compensation controller uses the output signals generated by the position controller as input signals of a controlled variable, wherein the second gravity compensation controller uses the output signals generated by the first gravity compensation controller as input signals, and wherein second gravity compensation controller output signals from the second gravity compensation controller are used to control the gravity compensation actuator.

19. A method for compensating gravitational forces acting on a position-controlled device, the method comprising:
measuring a position of the position-controlled device using a position sensor,
controlling the position-controlled device using a position controller to generate output signals of a manipulated variable from the measured position,
using the output signals generated by the position controller as a controlled variable to generate output signals of a gravity compensation controller,
using the output signals of the gravity compensation controller to control a gravity compensation actuator and compensate gravitational forces acting on the position-controlled device thereby.

20. The method of claim 19 wherein the step of using the output signals of the gravity compensation controller to control a gravity compensation actuator comprises sending the output signals of the gravity compensation controller directly to the gravity compensation actuator.

21. The method of claim 19 wherein the step of using the output signals of the gravity compensation controller to control a gravity compensation actuator comprises sending the output signals of the gravity compensation controller to a second gravity compensation controller.

* * * * *